Patented June 24, 1930

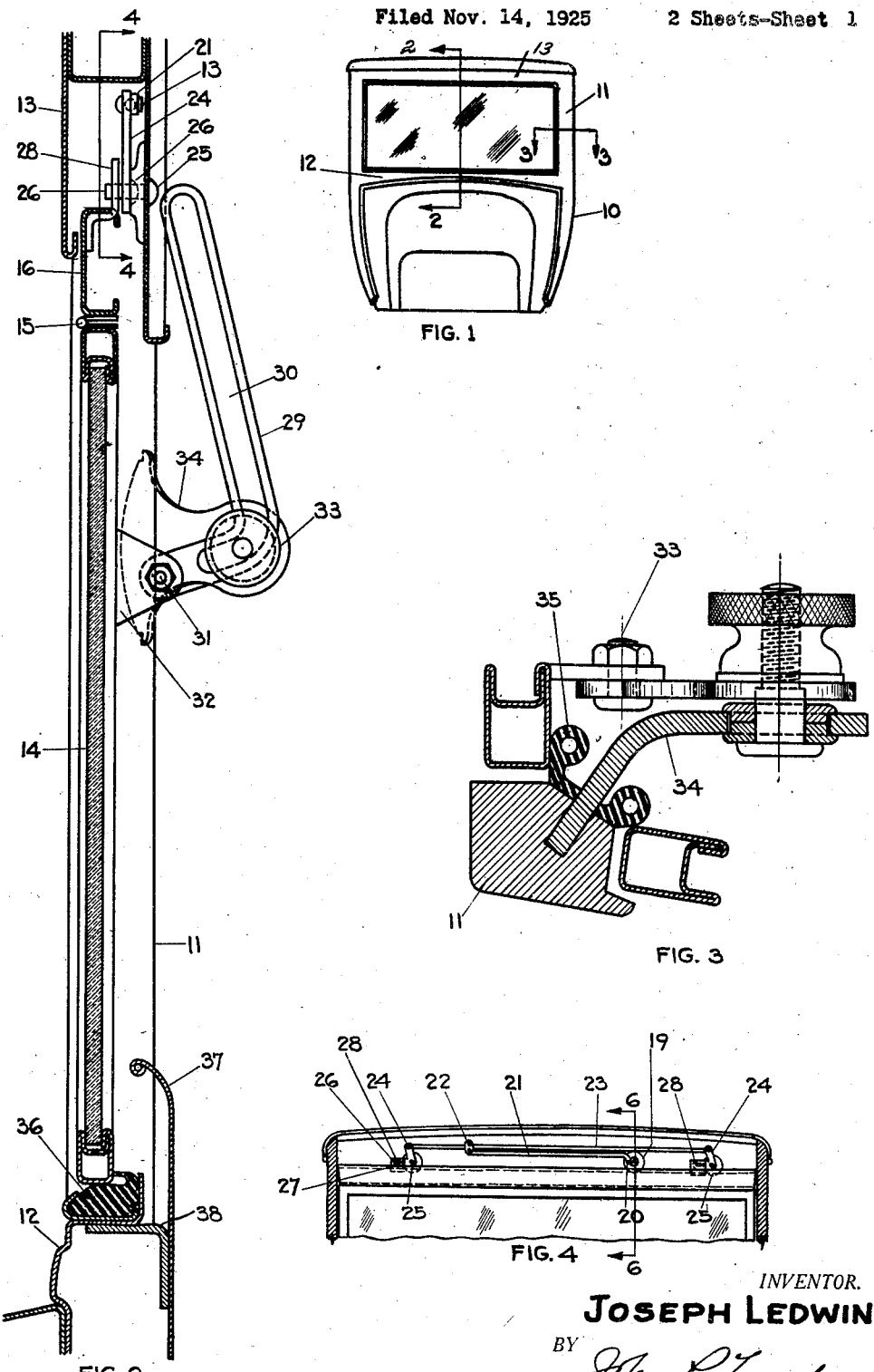

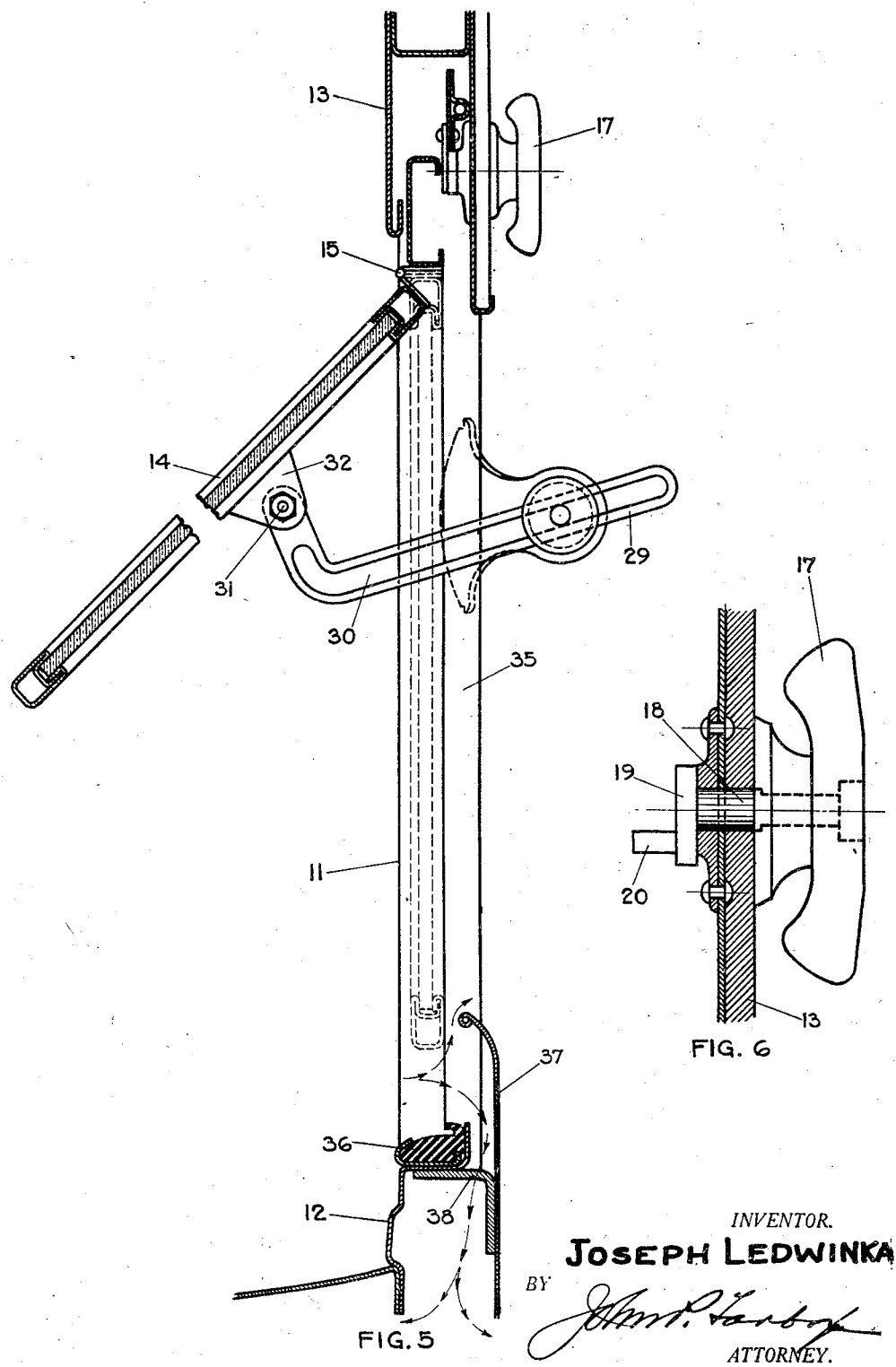

1,767,463

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA A CORPORATION OF PENNSYLVANIA

WINDSHIELD CONSTRUCTION

Application filed November 14, 1925. Serial No. 69,011.

My invention relates to windshields for vehicles, and especially for automobiles.

Heretofore, in the automobile art, one or the other of two distinct types of windshield has been extensively used. In one of said types the windshield or windshield panel is so organized and related to its supporting frame as to admit of vertical adjustment; no provision whatsoever for horizontal adjustment or swinging movement being made. In the other of said types, the windshield or panel, instead of being vertically adjustable relatively to its supporting frame, is adjustable horizontally and may accordingly be swung into various angular positions. In no instance, however, in so far as I am aware, has there been provided a type of windshield (prior to the present invention) offering the advantages of both the said well known types.

In addition to being both vertically adjustable and horizontally pivotal, the windshield panel herein disclosed is further characterized in that neither adjustment is in any way dependent upon, nor is it in any way effected by the other. The vertical adjustment may be accorded the windshield regardless of its angular position, and its angular position may be varied regardless of its vertical adjustment. Separate operating mechanisms are employed to effect such dual adjustment, the mechanism in each instance, embodying means for fastening the winshield panel in that position of adjustment desired. The advantages resulting from such dual adjustability are obvious.

Other objects and advantages of the invention will be hereinafter set forth.

In the drawings, wherein like reference characters denote like or corresponding parts, Fig. 1 is a front elevation of an automobile body having its windshield constructed in accordance with the present invention;

Fig. 2 is an enlarged vertical sectional view of the windshield taken on the line 2—2 of Fig. 1;

Fig. 3 is an enlarged horizontal sectional view taken approximately on the line 3—3 of Fig. 1;

Fig. 4 is a transverse vertical sectional view (reduced in size) taken on the line 4—4 of Fig. 2;

Fig. 5 is a view similar to Fig. 2 showing the windshield in different positions of adjusement, and Fig. 6 is an enlarged section taken on the line 6—6 of Fig. 4.

In the embodiment of the invention selected for illustration a closed or sedan type automobile body is shown. At its forward end the body 10 is provided with the usual windshield supporting frame, which frame comprises uprights 11, a base or bottom horizontal frame member 12, and a top horizontal frame member 13. Said top frame member 13 is of a hollow construction and is adapted to engage beneath and provide at the forward end of said body 10 a suitable support for the body top. The horizontal frame member 12, likewise hollow, is integral with the body.

The windshield, or windshield panel, designated in its entirety as 14, is preferably of a one piece construction. Along its top or upper edge it is hingedly or pivotally fastened as at 15 to the bottom forward edge of a pannel piece 16 extending across and mounted for vertical sliding movement within the windshield supporting frame. For the major part, said panel piece 16, is enclosed within the hollow top frame member 13, and is adapted to be raised and lowered therein to correspondingly adjust the windshield or windshield panel. Said frame member 13, along its under side or edge, is open from end to end. Preferably the frame members 13 and 14 and the panel piece 16 are each formed of one or more strips of sheet metal appropriately fastened together.

A wing-nut 17, conveniently positioned behind the windshield header 13, and on the inside of the automobile body, constitutes the operating mechanism for raising and lowering the panel piece 16 and the windshield 14 carried by it. Said wing-nut 17 is mounted on a stem 18 let thru the inner face of the transverse frame member 13 as indicated in Fig. 6. The stem 18, on the inside of the frame, carries an arm 19 terminally provided with an inwardly extending lug or pin 20. A rod 21 is connected at one end to said pin and at its opposite end is connected or fastened as at 22 to a second rod 23 which is in turn connected at its opposite ends to bell cranks 24, positioned one adjacent each end of and within the windshield header 13. Each bell crank 24 is pivotally supported as at 25 to rock simultaneously and to the same extent and is connected to the panel piece 16 by a pin and slot connection. The pins 26 of each of said connections are mounted, one on each bell crank, and the slots 27 thereof are formed, one in each of two plates 28 fastened to the panel piece respectively adjacent its ends. By shifting the pin or lug 20 through an arc of one hundred eighty degrees (180°), the rod 23 is axially shifted, the bell cranks simultaneously actuated, and the panel piece, with the windshield, raised or lowered vertically as the case may be. All of such operating mechanism, except the wing-nut 17, is completely hidden and protected by the windshield header 13.

The mechanism for horizontally swinging or angularly adjusting the windshield 14 is wholly separate and apart from the mechanism just described. Each vertical edge of the windshield 14 is provided with a right angle arm 29 having a right angle slot 30 formed in it. Each said arm 29 is pivoted as at 31 to a bracket 32 fastened to the windshield. By forcing said arms outwardly, or pulling said arms inwardly, the windshield can be swung horizontally about its pivot or hinge axis 15 to an extent determined by the length of the slots 30 in said arms. Thumb nuts 33, mounted in brackets 34 fastened to the windshield frame uprights 11, are separately operable to clamp the arms and hold the windshield in any angular position of swinging or horizontal adjustment desired. The brackets 34 may be fastened to or embedded within the uprights 11 of the windshield frame as illustrated in Fig. 3, and the windshield, when closed, may be made to abut and rest firmly against vertical weatherstrips 35 and a transverse weatherstrip 36 mounted at the bottom of the windshield.

A windshield characterized as above described is especially desirable on closed or sedan type automobile bodies. Its vertical adjustment, thru a comparatively limited range, gives ample ventilation, without excess, for winter or cold weather operation, whereas for summer or mild weather operation, thru horizontal adjustment, the windshield may be partly or widely opened as desired. In either case, as a means for preventing a direct back draft, a baffle or deflector plate 37 such as is shown in Figs. 2 and 5 may be employed. The height of this baffle is preferably such as to completely shield the opening formed in the windshield frame when the panel or windshield is fully opened thru vertical adjustment (see Fig. 15). This baffle 37 is horizontally spaced away from the lower windshield header panel 12 by mounting upon angle brackets 38, one branch of which is welded to the under side of the member 12 and the other branch of which is welded to baffle 37. Thus, when the windshield is raised, the incoming air may follow either or both of the courses shown by the arrows, the one downwardly between the angles 38 and thence within the body of the car, and the other upwardly around the upper edge of the baffle 37.

In conclusion, it should be noted that the length of short arm of lever 29 and the short arm of slot 30, and the location of the nut 33 are such that free vertical adjustment of the windshield frame 14 may take place to the full extent without engaging the nut with the long arm of the slot 30 and without oscillating the long branch of the arm 29 to such extent as to engage interior parts of the car.

The construction of the windshield frame embodying the headers 12 and 13 and the posts 11 is being claimed in an application being filed of even date herewith. Only the general form in its cooperative relationship to the windshield construction per se and the movements and adjusting mechanisms thereof is being claimed herein.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. A vehicle windshield including a supporting frame, a panel having a top member, a panel piece extending across and movable vertically within the frame to form a variable overlap with the top member, and a horizontally adjustable windshield panel pivotally fastened to and movable vertically with said panel piece.

2. A vehicle windshield including an upright supporting frame, a panel piece extended across and movable vertically within said frame, a windshield panel pivotally fastened to said panel piece, means for raising and lowering said panel piece, and the windshield panel within said frame, and separate means for swinging said panel horizontally about its pivot axis in any vertical position of adjustment of said panel piece.

3. A vehicle windshield including an upright supporting frame in which the top cross frame member thereof is hollow and open from end to end along its bottom edge, a panel piece adjustable vertically within said hollow frame member, and a horizontally adjustable windshield panel pivotally fastened to and movable vertically with said panel piece.

4. A vehicle windshield construction comprising a supporting frame and a windshield mounted therein, separate means for independently effecting vertical and horizontal adjustment of said windshield with respect to said supporting frame, and common means for clamping said windshield in all adjusted positions.

5. A vehicle windshield including an upright supporting frame, a panel having upper and lower relatively movable parts mounted within said frame, means engaging the upper part of the panel for raising and lowering said panel within said frame, a separate means for horizontally adjusting the lower edge of said panel in any of its various positions of vertical adjustment independently of the upper part of said panel.

In testimony whereof I hereunto affix my signature.

JOSEPH LEDWINKA.